Figure 1:
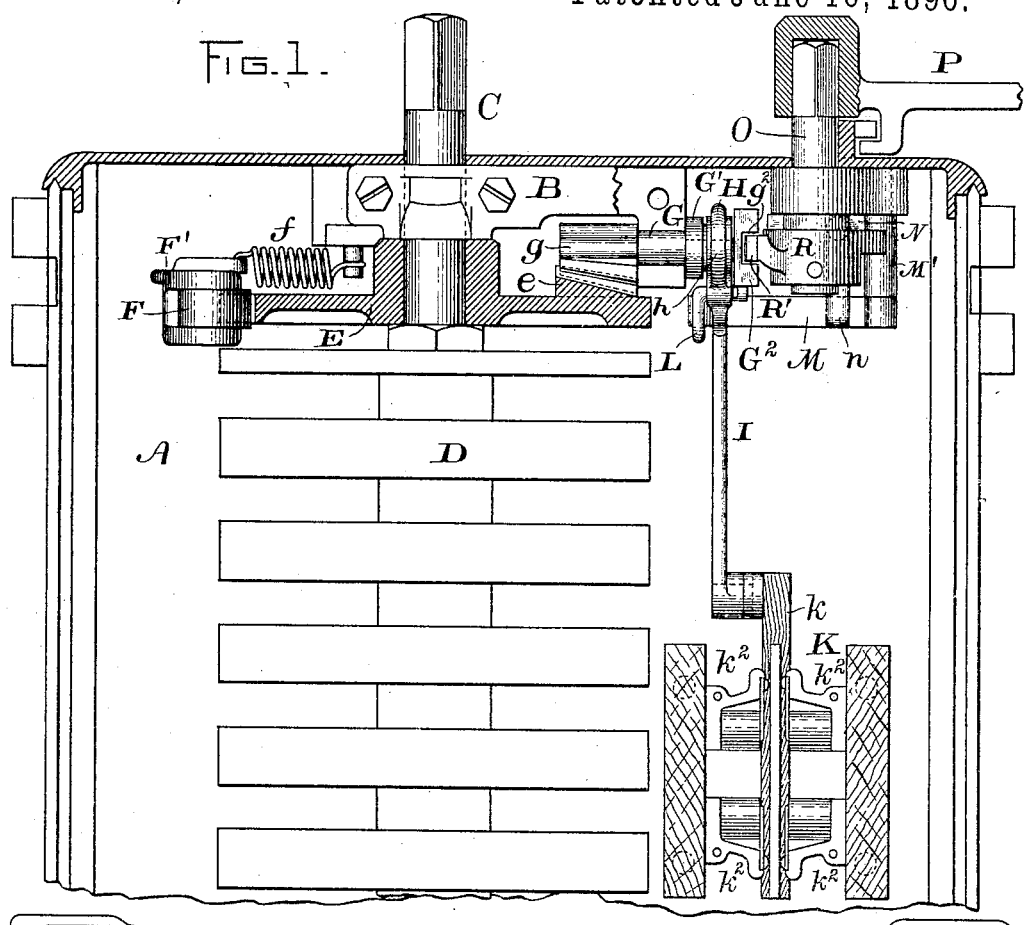

(No Model.)  2 Sheets—Sheet 1.

E. A. SPERRY.
CONTROLLER FOR ELECTRIC CARS.

No. 562,100.  Patented June 16, 1896.

WITNESSES.
O. H. Abell.
A. B. Macdonald.

INVENTOR.
Elmer A. Sperry
By Geo. R. Mudgett
Atty.

(No Model.) 2 Sheets—Sheet 2.
E. A. SPERRY.
CONTROLLER FOR ELECTRIC CARS.
No. 562,100. Patented June 16, 1896.
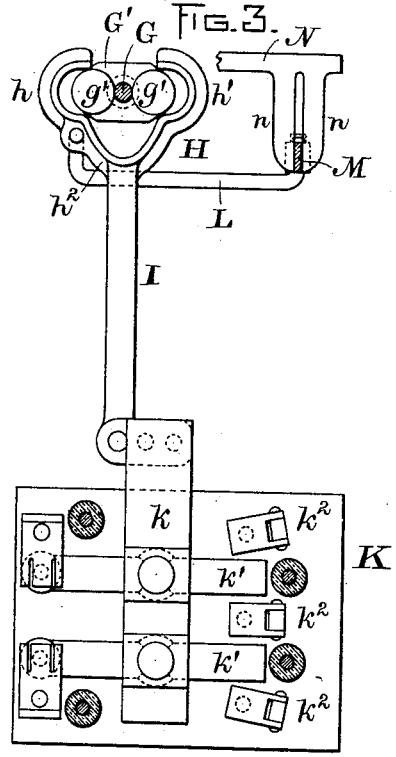
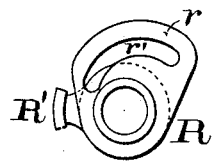
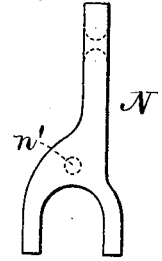
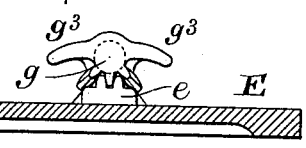
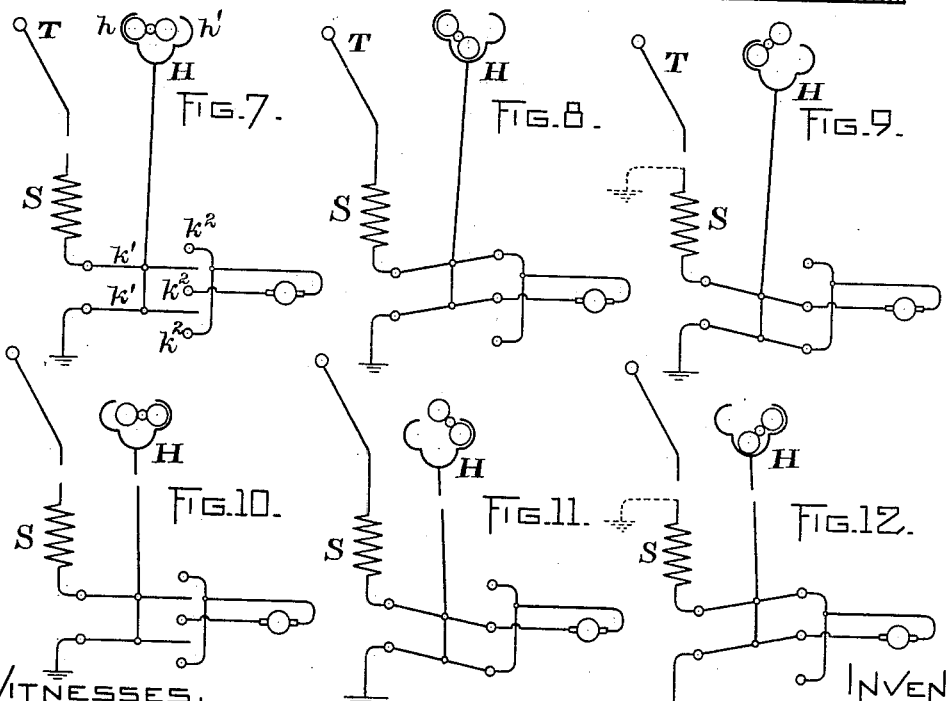
WITNESSES.
A. H. Abell.
A. F. Macdonald
INVENTOR
Elmer A. Sperry
By Geo. R. Blodgett
Atty

UNITED STATES PATENT OFFICE.

ELMER A. SPERRY, OF CLEVELAND, OHIO, ASSIGNOR TO THE GENERAL ELECTRIC COMPANY, OF NEW YORK.

CONTROLLER FOR ELECTRIC CARS.

SPECIFICATION forming part of Letters Patent No. 562,100, dated June 16, 1896.

Application filed March 20, 1896. Serial No. 584,062. (No model.)

*To all whom it may concern:*

Be it known that I, ELMER A. SPERRY, a citizen of the United States, residing at Cleveland, in the county of Cuyahoga, State of Ohio, have invented certain new and useful Improvements in Controllers for Electric Cars, (Case No. 327,) of which the following is a specification.

My invention relates to that class of controllers which are used not only to vary the current supplied to the motors on electric-railway cars, but also to regulate the operation of these motors when used as generators of current for energizing the magnets of electric brakes. These controllers are customarily provided with two reversing-switches, one to determine the direction in which the car shall travel, and the other to reverse the connections of the armature and field coils of the motor or motors at the time the power-circuit is broken and the braking-circuits are established. This second reversal is necessary because the current generated by the motor-armature is in the opposite direction to the power-current, and if it were allowed to flow through the field-coils in the opposite direction to the power-current it would destroy the residual magnetism of the field-cores and reverse the poles. This would entail not only a waste of energy, but also a loss of field strength just at the moment when it is most needed to generate the braking-current.

The object of the present invention is to simplify the construction of such a controller and lessen its cost of construction by so constructing a single reversing-switch that it will serve both for reversing the direction in which the car shall travel and also for reversing the relation between the armature and field coils when the brake is to be used. In connection with this single reversing-switch I use a regulating device separate from the controller for determining the direction in which the car shall run. After this device is set, it remains stationary, while the reversing-switch is free to move from one set of contacts to the other under the control of the main controller-handle, with which it is connected in such a manner that it is actuated in the interval between the "off" position of the power-circuit and the first position on the brake side of the controller.

Figure 2:
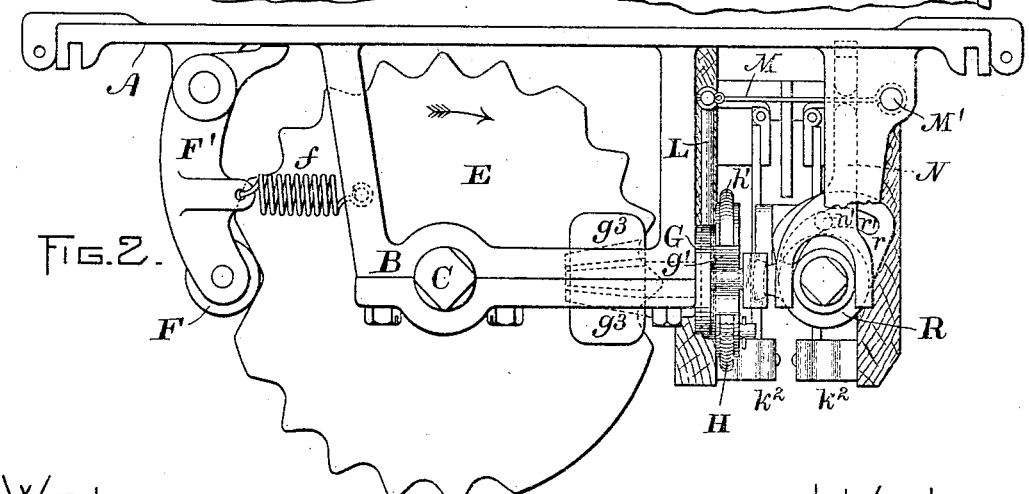

In the accompanying drawings, Figure 1 is an elevation, partly in section, of the parts composing my improved mechanism. Fig. 2 is a partial plan view of the same. Fig. 3 is an end elevation of the reversing mechanism. Figs. 4, 5, and 6 are details of the mechanism. Figs. 7, 8, 9, 10, 11, and 12 are diagrams illustrating the action of the switch.

Upon the usual back plate A is journaled in suitable bearings B the main shaft C, on which is mounted the controlling-cylinder D, provided with suitable contacts for making any desirable change in the circuit relations of the motors. The contacts on one side of the cylinder govern the power-circuit and the speed of the motors, while those on the other side control the braking-circuits. The cylinder has in each case a step-by-step movement regulated by a click-wheel E, with whose notches engages a roller F, pivoted in the end of a detent-pawl F' and held against the wheel by a spring $f$.

At a suitable point on the upper side of the click-wheel is fixed a short segment-gear $e$, adapted to engage with a segment-pinion $g$ on a rock-shaft G, arranged above the click-wheel and radially thereto. The outer end of the rock-shaft carries a double rock-arm G', on the face of which at each end is a cylindrical boss $g'$. An extension of the shaft carries a block $G^2$, containing a transverse groove $g^2$ in the plane of the line joining the centers of the bosses $g'$.

The rock-arm G' engages with a yoke H, carried on the upper end of a rod I, which actuates the reversing-switch K, being pivoted to the bar $k$, which connects the movable contacts $k'$. The stationary contacts $k^2$ are three in number, as usual, and if two motors are used they are duplicated, as shown in Fig. 1, the set on one side of the movable blades being connected with one motor, and the set on the other side with the other motor. When the yoke H is moved downward, the reversing-switch is thrown into one position. When the yoke moves upward, the switch is thrown to the opposite position. In the intermediate position the switch is open. In order that the switch may be appropriately thrown in accordance with the direction in which the car is running, the yoke is made of a trefoil or clover-leaf shape, as clearly shown in Fig. 3. In other words, it has two semicircular hooks $h\ h'$ facing each other, with a space between them, and connected by a drop-frame or ∪-shaped bar $h^2$. It is connected by a rod L with a lever M, preferably a flat spring supported at one end on a stud M', depending from a lug on the back plate. In order to actuate this lever, I provide a slide N, having near one end two depending jaws $n$ to engage the lever, and forked at the other end to fit around the upright stem O, which projects up through the controller-casing and is squared to receive the handle P. Below the yoke is affixed to the stem a hub R, having a flange $r$, containing an eccentric slot $r'$, engaging a pin $n'$, depending from the slide N. The hub R also has a projecting lug R' in the plane of the groove $g^2$ in the block $G^2$.

The operation is as follows: When the parts stand as in Figs. 1 and 2, the stem O can be turned, so that the eccentric slot $r'$ moves the slide N, thereby actuating the spring-lever M and throwing the yoke H to one side or the other from the central position in which it is shown in Fig. 3. This causes one of the hooks $h$ or $h'$ to engage with a cylindrical boss $g'$ on the rock-arm G', so that the movement of the rock-arm will lift or depress the yoke and actuate the reversing-switch. When the parts stand as shown in Figs. 1, 2, and 3, the circuits are all broken. A rotation of the click-wheel to the right (see arrow, Fig. 2) will close the power-circuit and start the motor. Conversely, a rotation of the click-wheel to the left will close the circuit through the braking connections. The gear $e$ is so placed on the click-wheel that it engages with the segment-pinion in the interval between the off position of the power and the first position of the brake contacts. The first movement of the click-wheel in either direction oscillates the rock-arm and actuates the yoke. A stop $g^3$, cast on the pinion, comes in contact with the surface of the click-wheel at the proper moment and limits the extent of rotation of the rock-shaft, besides retaining it in position to be engaged by the segment-gear $e$ upon a reverse movement of the click-wheel.

If the hook $h$ is in engagement with the rock-arm, as shown in Fig. 7, the movement of the click-wheel to start the motor will lift the yoke and close the reversing-switch through the upper contacts, as shown in Fig. 8. A reverse movement of the click-wheel shifts the reversing-switch to the lower contacts, as shown in Fig. 9, thereby reversing the armature connections and adapting the motor to operate as a generator.

If the hook $h'$ is in engagement with the yoke, as in Fig. 10, the motor will start in the opposite direction, as seen in Fig. 11, while the connections for braking will be as shown in Fig. 12. The field-coil S of the motor is connected at one end with one movable contact of the reversing-switch. The circuit between the other end of the field-coil and the trolley T is controlled by the contacts on the controller-cylinder. When the motor is propelling the car, the circuit is closed, as shown in Figs. 8 and 11. When the motor is operating as a generator, the field-coil is grounded to complete the local circuit, as indicated in Figs. 9 and 12.

It will be observed that there is no possibility of the motor connections being reversed while the current is on, since the lug R' cannot pass by the end of the rock-shaft unless the groove $g^2$ in the block $G^2$ is horizontal, and it stands in this position only when the click-wheel is in the off position.

By constructing the controller and reversing-switch as shown and described above, I am enabled to shorten up the controller-cylinder and condense the contacts on the reversing-switch in the smallest possible space. It is evident that the same construction can be used for either one, two, or more motors by simply providing the proper number of contacts.

Having thus described my invention, what I claim is—

1. The combination with a controller-cylinder, of a reversing-switch, operating connections between the cylinder and the movable contacts of said switch, and means for reversing the relative movement of said contacts when the car is to run in the opposite direction, substantially as described.

2. The combination with a controller-cylinder, of a reversing-switch controlling the flow of current to the motor-armature, operating connections between the cylinder and the movable contacts of said switch, and means for causing said connections to move the switch in either direction, at will, irrespective of the direction of movement of the cylinder substantially as described.

3. The combination with a controller-cylinder, provided with power-circuit contacts and brake-circuit contacts of a switch for reversing the armature connections, operating mechanism between said cylinder and said switch, and means for setting said mechanism to correspond with the direction in which the car is to travel, substantially as described.

4. The combination with a controller-cylinder, provided with power-circuit contacts and brake-circuit contacts, of a switch for reversing the armature connections and mechanism for causing said cylinder to operate said switch between the off position of the power-contacts and the first position of the braking-contacts, substantially as described.

5. The combination with a controller-cylinder, provided with power-circuit contacts, and brake-circuit contacts, of a switch for reversing the armature connections, mechanism for causing said cylinder to operate said switch in the interval between the off position of the power-contacts and the first position of the braking-contacts, and means for setting said mechanism to correspond with the direction in which the car is to travel, substantially as described.

6. The combination with a controller-cylinder, provided with power-circuit contacts and brake-circuit contacts, of a switch for reversing the armature connections, a yoke connected with said switch and provided with two hooks, a rock-arm adapted to engage with one or the other of said hooks, and operating mechanism actuated by said cylinder, substantially as described.

7. The combination with a controller-cylinder, having contacts for both power and brake circuits, of a switch for reversing the armature connections, a yoke for actuating said switch provided with two hooks, a double rock-arm carrying at each end a projection to engage with a hook, and devices on the cylinder for oscillating said rock-arm between the off position of the power and the first braking position, substantially as described.

8. The combination with a controller-cylinder, provided with contacts for both power and braking circuits, of a switch for reversing the armature connections, a yoke connected with said switch and provided with two hooks, a rock-arm adapted to engage with one or the other of said hooks, mechanism connecting the rock-arm with the cylinder, and means for shifting the yoke to determine which hook shall be engaged, substantially as described.

9. The combination with a controller-cylinder, of a reversing-switch, a yoke for actuating said switch, a double rock-arm for actuating the yoke, a rock-shaft carrying said arm, a segmental pinion on said shaft, and a segment-gear on the cylinder to engage with said pinion, substantially as described.

10. The combination with a controller-cylinder, of a reversing-switch, a yoke for actuating said switch, a double rock-arm for actuating the yoke, a rock-shaft carrying said arm, a segmental pinion on said shaft, a click-wheel on the cylinder-shaft, a segmental gear on the click-wheel and stops to limit the rotation of said shaft, substantially as described.

11. The combination with a controller-cylinder, of a click-wheel thereon, a segmental gear on said click-wheel, a rock-shaft journaled adjacent to said wheel, a segmental pinion on said shaft provided with wings to come in contact with said wheel and serve as stops, a double rock-arm on the end of the shaft, carrying a projection at each end, a yoke having two hooks to engage with said projections, and a reversing-switch actuated by said yoke, substantially as described.

12. The combination with a controller-cylinder, of a rock-arm actuated thereby, a yoke having two opposite open hooks adapted to be engaged by said rock-arm, a reversing-switch connected with said yoke, an upright shaft adjacent to said yoke, and connections between said shaft and yoke whereby the latter can be shifted to bring one hook or the other into engagement with the rock-arm, substantially as described.

13. The combination with a controller-cylinder, of a rock-arm actuated thereby, a yoke having two opposite open hooks adapted to be engaged by said rock-arm, a reversing-switch operated by said yoke, a lever connected with the yoke, a slide engaging with the lever, and means for actuating the slide, substantially as described.

14. The combination with the controller-cylinder, the rock-arm, the yoke and the reversing-switch, of a flat spring pivoted at one end and connected at the other end with the yoke, a slide having jaws engaging with said spring, and an upright shaft having a hub provided with a cam for actuating the slide substantially as described.

15. The combination with the controller-cylinder, of a rock-shaft actuated thereby and carrying at its end a block having a transverse groove, an upright shaft adjacent to said block, a hub secured to said shaft and provided with a finger adapted to pass through said groove when it is in a given position, a yoke adapted to be actuated by said rock-shaft, and intermediate connections between the yoke and the hub for shifting said yoke, substantially as described.

ELMER A. SPERRY.

Witnesses:
M. NIELSON,
VOLNEY SHARP.